United States Patent

[11] 3,589,481

| [72] | Inventors | Alfons Motsch<br>Bergneustadt;<br>Gerhard Mohn, Bergneustadt-Hackenberg, both of, Germany |
|---|---|---|
| [21] | Appl. No. | 830,695 |
| [22] | Filed | June 5, 1969 |
| [45] | Patented | June 29, 1971 |
| [73] | Assignee | Dr. Hermann E. Muller<br>Bez, Cologne, Germany |
| [32] | Priority | June 11, 1968 |
| [33] | | Austria |
| [31] | | 5,566/68 |

[54] BRAKE SYSTEM
9 Claims, 3 Drawing Figs.

[52] U.S. Cl.................................................. 188/345,
60/54.6 E, 92/35, 92/37, 188/370, 303/13
[51] Int. Cl............................................................ B60t 11/24
[50] Field of Search............................................ 188/152.2,
152.873, 106 P; 60/54.5, 54.6 E, 54.6 M; 92/35,
37, 38; 303/13

[56] References Cited
UNITED STATES PATENTS
| 1,642,784 | 9/1927 | Luomier.................. | 60/54.6 (M) X |
| 2,544,785 | 3/1951 | Gardner................... | 60/54.5 (E) |
| 2,931,179 | 4/1960 | Mayo........................ | 92/35 X |
| 3,074,435 | 1/1963 | Woestemeyer............ | 92/35 |
| 3,477,549 | 11/1969 | Barton..................... | 188/106 (P) X |

Primary Examiner—George E. A. Halvosa
Attorney—Michael S. Striker

ABSTRACT: An internal chamber is filled with pressure fluid. A plunger has a head which is reciprocable in the chamber towards and away from a wall portion thereof. Two bellows members are telescoped inside each other and define an inner space and a discrete outer annular space surrounding the inner space. One end portion of each of the bellows members is fluid-tightly connected to the plunger and the other fluid-tightly to the aforementioned wall portion. Conduit means leading to the wheel to be braked is provided in form of two conduits one of which communicates with the inner space and the other of which communicates with the outer annular space. Both spaces are filled with fluid. When the plunger is reciprocated towards the wall portion, the fluid is compressed and ejected into the conduit means for activating the brake or brakes associated with the conduit means and with the wheel or wheels which are to be braked.

PATENTED JUN29 1971 3,589,481

INVENTOR
ALFONS HOTSCH
GERHARD MOHN
BY
[signature]
ATTORNEY

BRAKE SYSTEM

BACKGROUND OF THE INVENTION

The present invention relates generally to a braking system, and more particularly to a dual braking system. Still more specifically the invention relates to a hydraulic dual braking system.

Hydraulically operated dual braking systems are of course not new. They have been known for an extended period of time and utilized usually an arrangement provided with two pistons arranged in tandem with one of the pistons activating the brakes associated with two of the wheels of the vehicle, and the other of the pistons activating the brakes associated with the remaining two wheels of the vehicle. Such braking systems are also known as so-called "power brakes" utilizing amplification arrangements wherein the movements of the brake pedal are used to control, via valve systems in known manner, a pneumatic or hydraulic brake force amplifier which in turn actuates the pistons.

Such use of brake force amplifiers requires the provision of means capable of providing the driver who actuates the brake pedal with feedback signals in order to advise him of the braking force exerted via the intermediary of the brake force amplifier. Absent such feedback information it would be impossible for the driver to determine what force to apply upon the pedal. Known constructions for this purpose are very complicated and require many relatively movable parts which must be pressure-tightly mounted in mountings capable of withstanding extremely high pressures on the order of up to approximately 200 atmospheres. It is evidently expensive to manufacture and assemble such systems, not to mention the maintenance involved. A further disadvantage is to be seen in the fact that brake systems which are so complicated as the ones just mentioned can only with great difficulty be constructed as true dual systems and, accordingly, such brake systems are constructed primarily in such a manner that, if one of the brake circuits becomes inoperative for any reason, the two wheels with which it is associated can no longer be braked. Accordingly, the braking effectiveness is reduced by half or more. Added to this is the fact that the braking of only two of the wheels, that is either the front wheels or the rear wheels, can be dangerous if the highway surface is in slippery condition. Finally, it is not possible in such systems to hermetically seal the hydraulic system and the expulsion of small, even minute, but nevertheless significant quantities of brake fluid cannot be precluded. This makes it necessary to provide a brake fluid reservoir which in turn is a complication in the construction of the system and brings with it the dangerous possibility that small quantities of air could enter into the hydraulic system. All of this is of course highly disadvantageous, particularly if one considers the tendency towards increasingly more powerful engines and accordingly increasingly faster automobiles. Coupled with this is the fact that there is a tendency to reduce the available space in order to permit construction of the automobile in more compact shape. The latter tendency evidently also reduces the space which is available for the braking system, whereas the former tendency necessitates more and more urgently that the driver of a vehicle provided with servo brakes that is with brake force amplification devices, be afforded a precise "feel" of the braking action which he provided when he depresses the brake pedal. This is particularly important if one of the two brake circuits becomes inoperative for any reason because the driver must then be immediately given a precise indication of how this affects the braking force available. This, in particular, is a rather neglected aspect of modern braking systems because in almost all braking systems known to me which utilize dual systems the feedback information supplied to the pedal remains unchanged even if one of the braking systems becomes inoperative. In fact, I am aware of a braking system using a braking force amplifying device and a feedback arrangement wherein the latter even indicates full braking effectiveness when both of the braking systems or circuits have become inoperative, that is when the vehicle has no braking force available at all.

There are a very few "true" dual-circuit braking systems known, that is braking systems wherein each circuit controls all four wheels of the vehicle. However, in these technical problems heretofore have made it impossible to provide feedback information from more than only one of the two circuits so that, if one of the circuits becomes inoperative, a precise indication of the loss of braking power is missing in this type of construction also.

On the other hand, the need to provide precise feedback information is becoming even more crucial because under modern traffic conditions the failure of braking systems is becoming increasingly frequent. For instance, in traffic jams where a driver must proceed in stop-go manner for extended periods of time, the brakes must be constantly used, the vehicle engine becomes hotter and hotter and the brakes, particularly those associated with the wheels located adjacent the vehicle engine, overheat in the absence of cooling air which normally results from rapid movement of the vehicle and due to radiated heat from the engine and frictional heat from brake activation. This frequently leads to the formation of steam bubbles in the brake cylinders associated with the wheels and results in failure of the hydraulic braking action.

All of this is indicative of the urgent need for an improved dual-circuit brake system.

SUMMARY OF THE INVENTION

It is, accordingly, a general object of the present invention to provide such an improved dual-circuit brake system which is not possessed of the aforementioned disadvantages.

More particularly, it is an object of the invention to provide such a brake system which is simple and inexpensive in its construction, which requires no or few relatively movable parts, and wherein the individual brake circuits are completely separated from one another.

A further object of the invention is to provide such a brake system which is capable of effecting braking of all wheels of a vehicle with either of its dual circuits.

In pursuance of the above objects, and others which will become apparent hereafter, one feature of my invention resides, briefly stated, in the provision of a brake system which is particularly suitable for automotive vehicles, but not exclusively so, and which comprises wall means defining an internal chamber and plunger means movable in the chamber toward and away from a wall portion bounding the chamber. A pair of elastically axially compressible tubular members are telescoped together and define an inner space and a discrete annular outer space which surrounds the inner space. The tubular members consist of fluid-tight material and each have opposite ends which are respectively fluid-tightly connected to the plunger means and to the aforementioned wall portion. A body of pressure fluid is accommodated in each of the spaces and separate conduits are connected to the wall portion and communicate therethrough with the respective inner and outer spaces. Actuating means serves for displacing the plunger means in the chamber towards the aforementioned wall portion whereby to effect simultaneous axial compression of the tubular members and concomitant simultaneous pressurization of the bodies of pressure fluid in these spaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
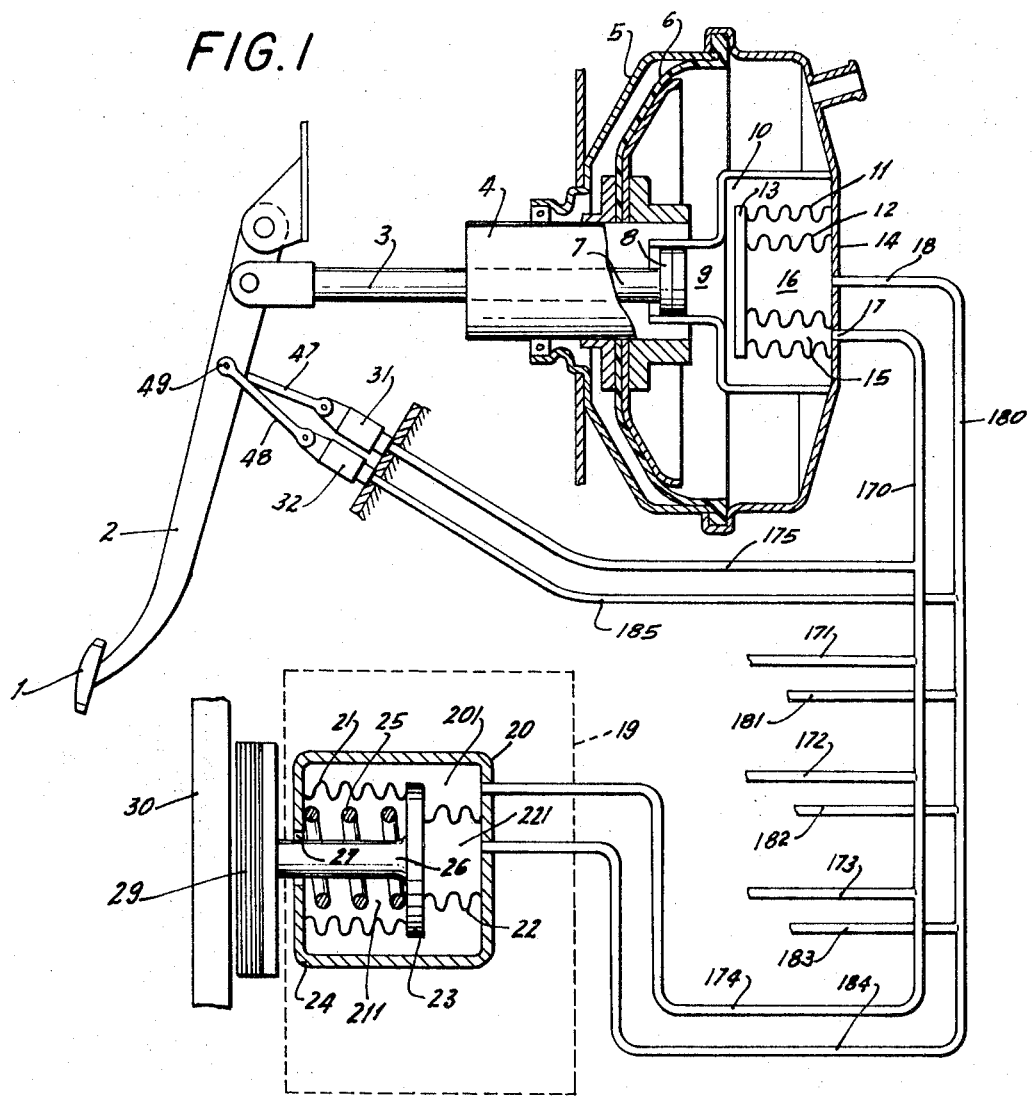
FIG. 1 is a diagrammatic partially sectioned illustration showing one embodiment of a braking system according to the present invention.
Figure 2:
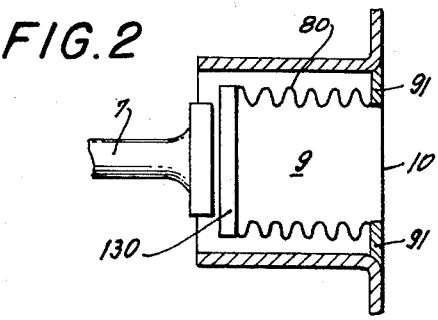
FIG. 2 is a fragmentary longitudinal section of one embodiment of one of the components for use in the system shown in FIG. 1.

Discussing firstly the embodiment of FIG. 1 it will be seen that the braking system there illustrated comprises a braking pedal 1 of conventional type which is operated by the foot of the driver. It is connected via a lever arm 2 with the shaft 3 of a plunger which controls, via a diagrammatically illustrated valve system whose precise construction is of no importance for the invention, the auxiliary piston 6 which is located in the auxiliary cylinder 5 and pneumatically operated. The auxiliary piston 6 in turn operates via a pressure body 7 on a hydraulic primary force-transmitting member 8 which pressurizes the primary cylinder 9 and the primary pressure chamber 10 with hydraulic pressure. The member 8 may, as shown in FIG. 2, consist of a bellows 80 supported on a supporting ring 91 and against which the member 7 abuts. Located in the chamber 10 are bellows members 11, 12 which are telescoped coaxially in such a manner that they define an inner cylindrical space 16 and an outer annular space 15 which surrounds but is discrete with reference to the inner space 16. A common cover plate 13, which may be thought of as a part of the member 7, or which may be thought of as a plunger in its own right, is identified with reference numeral 13 and fluid-tightly closes one end of each of the bellows members 11, 12. The opposite ends of these members are fluid-tightly connected to the wall portion 14 of the pressure chamber 10.

The wall portion 14 is provided with apertures 17 and 18 to which there are connected the conduits 170 and 180, respectively. Thus, each of these conduits communicates through the respective aperture with one of the spaces 15 and 16. Branch conduits 171, 172, 173, 174 and 181, 182, 183 and 184 lead from the conduits 170 and 180 respectively to the wheels which are to be braked and which are not illustrated. More particularly, these branch conduits lead to user devices 19 of which one is illustrated by way of explanation, it being understood that these user devices will each be provided on one of the wheels. The user device shown in FIG. 1 is illustrated as being connected with the branch conduits 174 and 184, respectively.

As FIG. 1 shows, the user device 19 forms a chamber 20 which again contains two coaxially arranged bellows members 21 and 22, respectively. However, in this case the bellows members 21 and 22 are axially aligned with a common pressure plate 23 being located between their proximal ends. The pressure plate 23 is fluid-tightly connected to each of the bellows members 21 and 22, whereas the latter is fluid-tightly connected also to a wall portion bounding the chamber 20. The other end of the bellows member 21 is fluid-tightly connected to an opposite wall portion bounding the chamber 20 which is provided with an aperture 27 through which a portion of the shaft 26 which is rigid with or of one piece with the pressure plate 23 extends outwardly of the chamber 20. It will be understood, of course, that the bellows members 21 and 22, as well as the ones identified with reference numerals 11 and 12, are of fluid-tight material. In so far as the restoring ability of the material of the bellows members does not suffice to restore them—subsequent to depression—to their original extended position, the device 19 may further comprise a helical spring 25 which is located within the bellows member 21 so as to be in position surrounding the stem portion 26 and draw the latter to the maximum possible extent into the chamber 20 when the braking force is released via the pedal 1. Reference numeral 28 identifies a carrier member for the friction pad of braking member 29 which is to be pressed against the rotor disc 30 if the brake is a disc brake. Of course, a conventional brake other than a disc brake can be analogously provided. If desired, and this is not illustrated but constitutes a further concept of the invention, a ball bearing may be located in the aperture 27 through which the shaft portion 26 may slide into and out of the chamber 20. The bellows members 21 and 22 form three spaces in the interior of the chamber 20, namely the space 201, space 211 and the space 221. The branch conduit 174 communicates through the wall of the chamber 20 with the space 201 whereas the branch conduit 184 communicates with the space 221. The space 211 located within the bellows member 21 communicates via the aperture 27 with the ambient atmosphere, but the space 211 is fluid-tightly separated from the space 201 as illustrated, by the fact that the end of the bellows member 21 which is connected to the wall of the chamber 20 is fluid-tightly connected radially outwardly of the aperture 27.

Figure 3:
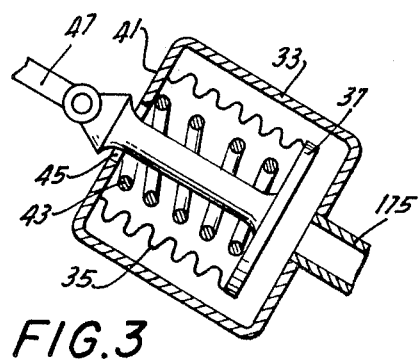
FIG. 3 is a longitudinal section through a feedback indicating device according to the invention.

As FIG. 1 shows, there are two further branch conduits 175 and 185 provided branching off from the conduits 170 and 180 respectively. These branch conduits, which are feedback conduits, communicate with a feedback indicating device 31 and 32 consisting, according to one embodiment of the invention as shown in FIG. 3, of a chamber 33 with those interior either the conduit 175 or the conduit 185 communicates, depending on whether the device 31 or the device 32 is involved. In other words, the devices 31 and 32 are identical. Each of the chambers 33 contains a bellows member 35 and a plunger consisting of a head or pressure plate 37 and a stem which extends outwardly through an aperture 45 in the wall of the chamber 33. Of course, the bellows member 35 is again fluid-tightly connected at one end with the head or pressure plate 37 and at the other end with the wall of the chamber 33 radially outwardly of the aperture 45. A helical spring 43 may be provided to restore the bellows member 35 to the position shown in FIG. 3 when braking force as a result of pressurized fluid from the conduit 175 or 185 is again released. As FIG. 1 shows, a linkage arrangement 47 or 48 connects the respective plungers 37 with the lever arm 2 of the brake pedal 1, to which lever arm it is articulately connected at 49, it being evident from FIG. 1 that both of the linkage arrangements 47 and 48 are connected to the lever arm 2 in one and the same point 49.

In operation of the novel "true" dual-circuit dual braking system the driver presses upon the brake pedal 1 and activates the auxiliary piston 6 via the lever arm 2, the member 3 and the valve system 4. The auxiliary piston 6 now exerts pressure via the member 7 onto the member 8 so that the latter produces hydraulic pressure in the chamber 10. This pressure, in turn, acts upon the plate 13 and thereby moves the same towards the opposite side of the chamber 10, axially compressing the bellows members 11 and 12. The pressure which thus is developed in the spaces 15 and 16 within the bellows members 11 and 12 is transmitted via the hydraulic conduits 170 and 180 and their branch conduits 171, 181; 172, 182; 173, 183 and 174, 184 to the respective devices 19 of which one is associated with each of the wheels to be braked. As a result, the pressure which is transmitted from the space 15 through the hydraulic conduit and branch conduits, in the exemplary illustration in FIG. 1 the conduits 170 and 174, is transmitted into and exerted in the chamber 20 of each of the devices 19. The pressure from the space 16, on the other hand, is transmitted via the conduits 180 and 184 (in the embodiment of FIG. 1) to the space 221 located within the bellows member 22 of the device 19. Both pressure act upon the plate 23 so that the shaft 26 is advanced outwardly of the chamber 20 against the resistance of the bellows member 21 and against the resistance of the spring 25 if the latter is provided. Thus, the friction member 29 is pressed against the rotor disc 30. The space 211 communicates with atmospheric air, the aperture 27 having a larger cross-sectional area than the shaft 26. To provide more reliable guidance and possible binding or clamping of the shaft 26 in the aperture 27, the ball bearing mentioned earlier may be provided in the aperture 27.

The pressures which are created in the conduits 170 and 180 are also transmitted to the feedback indicating devices 31 and 32 through the conduits 175 and 185, respectively. In these devices the bellows members 35 are compressed against the resistance of the springs 43 so that the plungers 39 move outwardly through the apertures 45 and act upon the linkages 47 onto the lever 2. The cross-sectional areas of the plates 37 are smaller than the cross-sectional areas of the corresponding bellows members 11 and 12 by as much as the foot pressure exerted in $kp$ is smaller than the servopressure exerted by the auxiliary piston 6. For instance, the ratio may be 1:4 or 1:5. By correspondingly dimensioning the cross sections it is possible to control at will a further parameter, namely the relationship of braking effect on the front wheels with respect to the braking effect on the rear wheels.

With the present invention the feedback force exerted by the devices 31, 32 and acting upon the lever 2 will be constantly proportional to the actually exerted pressure provided by the foot of the driver. Thus, the driver will have a direct "-feel" for the braking force which he exerts, that is he will have the feeling that he acts with his own foot to exert the braking action without the intermediary of the servomechanism. The relationship between the feedback indication, that is the foot pressure exerted by the driver and the actually applied servo-force, is reliably constant and the function brake pedal force/servo-force, if plotted on a graph, is a straight line from the beginning of the braking action without any deviations.

If, now, one of the braking circuits should become inoperative, for instance the one associated with the conduit 170, then the pressure in the chamber 10 only acts upon the cross section of the bellows member 12. However, each of the devices 19 nevertheless remains under pressure. The reason for this is that although no pressure is exerted from the space 201 upon the plate 23, the pressure in the space 221 continues to act upon the plate 23, or more specifically upon a cross-sectional area thereof which corresponds to that of the bellows member 22. While one of the feedback indicating devices 31, that is the one associated with the conduit 175, no longer receives pressure and therefore no longer provides a feedback indication, the device 32 continues to operate and to provide the driver continuously with a feedback indication which is accurate because it is in form of a precise function of the braking force remaining available to him. It thus becomes clear to the driver that he must further depress the brake pedal in order to obtain the desired braking effectiveness.

It will be evident that if one of the braking circuits becomes inoperative, neither the member 8 nor the pressure plate 13 will yield because the pressure plate 13 is prevented from doing so because of the incompressibility of the pressure fluid in the remaining conduit which is intact. The only thing that will happen will be a reduction in the pressure in the system. Thus, it is impossible for the brake pedal to suddenly yield completely, that is to "go dead," a situation which most frequently causes the driver to panic.

Further advantages of the present invention will also be obvious from the disclosure, including the drawing. Thus, the construction of the system is extremely compact, the hydraulic circuits are hermetically closed and require neither supply containers nor bleeding of air. The pressure fluid cannot become contaminated because there is no friction in the system and once the system is filled, it need not be refilled. The bellows members are preferably made from special steels and they are inherently elastically yieldable. In fact, they are practically indestructible under ordinary operating conditions. However, other materials are also suitable and it is not absolutely necessary that the bellows members be actually bellows, as long as they are members capable of performing the required function. There is no fluid-tight sealing required for movable parts unless a usual piston-cylinder system is used such as is shown in FIG. 1 by way of example. Evidently, other solutions are readily possible and evident to those skilled in the art.

It will be understood that each of the elements described above, or two or more together, may also find a useful application in other types of constructions differing from the types described above.

While the invention has been illustrated and described as embodied in a brake system, it is not intended to be limited to the details shown, since various modifications and structural changes may be made without departing in any way from the spirit of the present invention.

We claim:

1. A brake system, particularly for automotive vehicles, comprising wall means defining a pressure-tight internal chamber; plunger means movable in said chamber toward and away from a wall portion bounding said chamber; a pair of elastically axially compressible tubular members telescoped together and defining an inner space and a discrete annular outer space surrounding said inner space, said tubular members consisting of fluidtight material and each having opposite ends which are respectively fluid-tightly connected to said plunger means and said wall portion; a body of pressure fluid accommodated in each of said spaces; an additional body of pressure fluid accommodated in said chamber; separate conduits connected to said wall portion and communicating therethrough with the respective inner and outer spaces; and actuating means operative for pressurizing said additional body of pressure fluid to thereby displace said plunger means through the intermediary of the pressurized additional body of pressure fluid in said chamber towards said wall portion so as to effect simultaneous axial compression of said tubular members and concomitant simultaneous pressurization of the bodies of pressure fluid in said spaces.

2. A brake system as defined in claim 1, said chamber having an inlet; and said actuating means comprising a fluid-filled bellows member located exteriorly of said chamber and having one end portion fluid-tightly and coaxially connected to said inlet thereof, and a reciprocable member fluid-tightly connected with the other end portion of said bellows member and reciprocable in direction towards and away from said inlet.

3. A brake system as defined in claim 1, and further comprising at least one user device associated with said conduit means and with a wheel to be braked for effecting braking of the wheel in response to pressurization of said bodies of pressure fluid in said space.

4. A brake system as defined in claim 3, said user device comprising a pressure chamber having two spaced opposite walls, a plunger member in said pressure chamber and having a head and a shaft extending through an aperture in one of said walls to the exterior of said pressure chamber, a friction member carried by said shaft exteriorly of said chamber, a pair of axially elastically compressible fluid-tight tubular elements one of which surrounds said shaft intermediate said head and said one wall outwardly of said aperture and being fluid-tightly connected to both, and the other of which is located intermediate said head and the other wall fluid-tightly connected to both; and wherein said separate conduits respectively communicate with said pressure chamber exteriorly of both of said tubular elements and with the interior of said other tubular element.

5. A brake system as defined in claim 4, wherein said tubular members and said tubular elements are bellows-shaped.

6. A brake system as defined in claim 4; further comprising an annular ball bearing installed in said aperture, and said shaft extending slidably through said ball bearing.

7. A brake system as defined in claim 4, said actuating means further comprising an actuating pedal for depressing by a foot of an operator.

8. A brake system as defined in claim 7; and further comprising feedback means associated with said actuating pedal and operative for feeding back to said pedal pressures indicative of the operation of said brake system.

9. A brake system as defined in claim 8, said feedback means comprising a pair of fluid-tight pressure-fluid containing compartments, a reciprocable member received in each of said compartments and having a head and a stem portion extending through an aperture in a wall to the exterior of the respective compartment, connecting means articulately connecting each such stem portion with said pedal, a bellows member surrounding each reciprocable member in the respective compartment intermediate said head and said aperture radially outwardly of the latter and being fluid-tightly connected to the respective head and wall, and a pair of feedback conduits each connected with one of said separate conduits and each communicating with one of said compartments exteriorly of the respective bellows member.